US008731741B2

(12) United States Patent
Oesterling

(10) Patent No.: US 8,731,741 B2
(45) Date of Patent: May 20, 2014

(54) METHOD FOR PROVIDING A SECURITY SERVICE USING A VEHICLE KEYFOB

(75) Inventor: Christopher L. Oesterling, Troy, MI (US)

(73) Assignee: General Motors LLC, Detroit, MI (US)

( * ) Notice: Subject to any disclaimer, the term of this patent is extended or adjusted under 35 U.S.C. 154(b) by 1600 days.

(21) Appl. No.: 11/963,258

(22) Filed: Dec. 21, 2007

(65) Prior Publication Data

US 2009/0164053 A1 Jun. 25, 2009

(51) Int. Cl.
*G05D 1/00* (2006.01)

(52) U.S. Cl.
USPC ............... 701/2; 701/29.1; 701/32.3; 701/36; 701/408; 701/517; 340/425.5; 340/426.1; 340/438; 379/37; 379/45; 455/404.1; 455/410; 455/426.1; 455/456.1; 455/461

(58) Field of Classification Search
None
See application file for complete search history.

(56) References Cited

U.S. PATENT DOCUMENTS

| 5,874,889 | A | * | 2/1999 | Higdon et al. | 340/426.36 |
|---|---|---|---|---|---|
| 6,020,654 | A | * | 2/2000 | Chutorash | 307/10.1 |
| 6,505,106 | B1 | * | 1/2003 | Lawrence et al. | 701/29.3 |
| 6,675,006 | B1 | * | 1/2004 | Diaz et al. | 455/404.1 |
| 7,228,211 | B1 | * | 6/2007 | Lowrey et al. | 701/31.5 |
| 2002/0057764 | A1 | * | 5/2002 | Salvucci et al. | 379/37 |
| 2002/0115436 | A1 | * | 8/2002 | Howell et al. | 455/426 |
| 2004/0105529 | A1 | * | 6/2004 | Salvucci et al. | 379/45 |
| 2005/0248444 | A1 | * | 11/2005 | Joao | 340/426.13 |
| 2005/0249351 | A1 | * | 11/2005 | Miyahara | 380/255 |
| 2006/0082434 | A1 | * | 4/2006 | Brey | 340/5.6 |
| 2006/0208856 | A1 | * | 9/2006 | Nakashima et al. | 340/5.72 |
| 2006/0234727 | A1 | * | 10/2006 | Ashley et al. | 455/456.4 |
| 2006/0258377 | A1 | * | 11/2006 | Economos et al. | 455/461 |
| 2007/0035397 | A1 | * | 2/2007 | Patenaude et al. | 340/572.1 |
| 2007/0298765 | A1 | * | 12/2007 | Dickinson et al. | 455/410 |
| 2008/0061931 | A1 | * | 3/2008 | Hermann | 340/5.72 |
| 2008/0074260 | A1 | * | 3/2008 | Reiner | 340/568.5 |
| 2008/0090546 | A1 | * | 4/2008 | Dickinson et al. | 455/404.1 |
| 2008/0214165 | A1 | * | 9/2008 | Matsumura et al. | 455/414.3 |
| 2008/0258890 | A1 | * | 10/2008 | Follmer et al. | 340/439 |
| 2009/0023425 | A1 | * | 1/2009 | Hosain et al. | 455/412.1 |
| 2009/0164053 | A1 | * | 6/2009 | Oesterling | 701/2 |

* cited by examiner

*Primary Examiner* — Khoi Tran
*Assistant Examiner* — Jonathan L Sample
(74) *Attorney, Agent, or Firm* — Anthony Luke Simon; Reising Ethington P.C.

(57) ABSTRACT

A system and method that enables a user of a telematics-equipped vehicle to initiate security services by activating their vehicle keyfob. If a user senses an emergency situation, such as a person breaking into their home, they can engage a panic button on their vehicle keyfob. This causes the vehicle to send a wireless warning signal to a call center which already has emergency contact numbers on file. The call center can then call the user to see if they require assistance from a police department, fire department, ambulance, etc. In one embodiment, the method also determines if the vehicle is currently located within a certain proximity of one or more designated locations (usually the user's home or work) before contacting the user. This can reduce responses to non-emergencies, such as when a user simply presses their panic button in order to locate their vehicle in a crowded parking lot.

9 Claims, 2 Drawing Sheets

METHOD FOR PROVIDING A SECURITY SERVICE USING A VEHICLE KEYFOB

TECHNICAL FIELD

The present invention relates generally to security services and, more particularly, to security services that are provided by using wireless transmitters, such as vehicle keyfobs, and telematics-equipped vehicles.

BACKGROUND

Numerous types of wireless communication devices are used throughout the world each day, including devices such as cellular phones, pagers, personal digital assistants (PDAs), and vehicle communication devices. Many of these devices use one or more types of communication channels, including voice and data channels, to provide a variety of services over wireless networks. Some devices utilize data encoding techniques to communicate both voice and data information over a voice channel, while other devices must use a data channel to send data information.

There are instances where it could be useful to integrate, combine or otherwise utilize the features and abilities of a telematics-equipped vehicle in order to accomplish additional results. One such area involves security services.

SUMMARY OF THE INVENTION

According to an aspect of the invention, there is provided a method for providing a security service using a vehicle keyfob. The method generally comprises the steps of: (a) enrolling a telematics-equipped vehicle in the security service; (b) implementing response instructions; (c) receiving a wireless warning signal from the telematics-equipped vehicle at a call center, wherein the wireless warning signal is generated in response to the activation of the vehicle keyfob; and (d) responding to the wireless warning signal.

According to another aspect, there is provided a method for providing a security service using a vehicle keyfob. This method generally comprises the steps of: (a) receiving a wireless activation signal from the vehicle keyfob at a telematics-equipped vehicle; (b) utilizing the wireless activation signal to determine if a panic button has been engaged; and (c) if the panic button has been engaged, then sending a wireless warning signal from the telematics-equipped vehicle to a call center, wherein the wireless warning signal indicates that the panic button on the vehicle keyfob has been engaged.

According to another aspect, there is provided a method for providing a security service using a vehicle keyfob. This method generally comprises the steps of: (a) determining a designated location and a vehicle location; (b) receiving a wireless activation signal from the vehicle keyfob at a telematics-equipped vehicle, wherein the wireless activation signal indicates that a panic button on the vehicle keyfob has been engaged; (c) sending a wireless warning signal from the telematics-equipped vehicle to a call center, wherein the wireless warning signal indicates that the panic button on the vehicle keyfob has been engaged; (d) receiving the wireless warning signal at the call center; and (e) responding to the wireless warning signal if the designated location and the vehicle location are within a certain proximity of each other.

In accordance with another aspect of the invention, there is disclosed a system for providing a security service using a vehicle keyfob. The system includes a vehicle having a telematics unit, a keyfob, and a call center. The keyfob has a panic button and is capable of transmitting a wireless activation signal to the vehicle, wherein the wireless activation signal indicates that a panic button on the keyfob has been depressed. The call center wirelessly communicates with the vehicle telematics unit via a wireless carrier system. The vehicle is responsive to receipt of the wireless activation signal to supply a warning signal to the call center via wireless communication from the telematics unit.

BRIEF DESCRIPTION OF THE DRAWINGS

One or more preferred exemplary embodiments of the invention will hereinafter be described in conjunction with the appended drawings, wherein like designations denote like elements, and wherein.

DETAILED DESCRIPTION OF THE PREFERRED EMBODIMENT(S)

The security method described below enables a user of a telematics-equipped vehicle to initiate security services by activating their vehicle keyfob. If a user senses an emergency situation, such as a person breaking into their home, they can engage a panic button on their vehicle keyfob. This causes the vehicle keyfob to send a wireless activation signal to their telematics-equipped vehicle, which in turn sends a wireless warning signal to a call center. The call center, which already has emergency contact numbers on file, can then call the user to see if they require assistance from a police department, fire department, or some other public-safety answering point (PSAP). According to one embodiment, the security method further determines if the telematics-equipped vehicle is currently located within a certain proximity of a designated location (usually a home or work location) before contacting the user. This enables the security method to distinguish between true emergencies, like the home invasion mentioned above, and non-emergencies such as when a user simply presses their panic button in order to locate their vehicle in a crowded parking lot.

Communications System—

Figure 1:
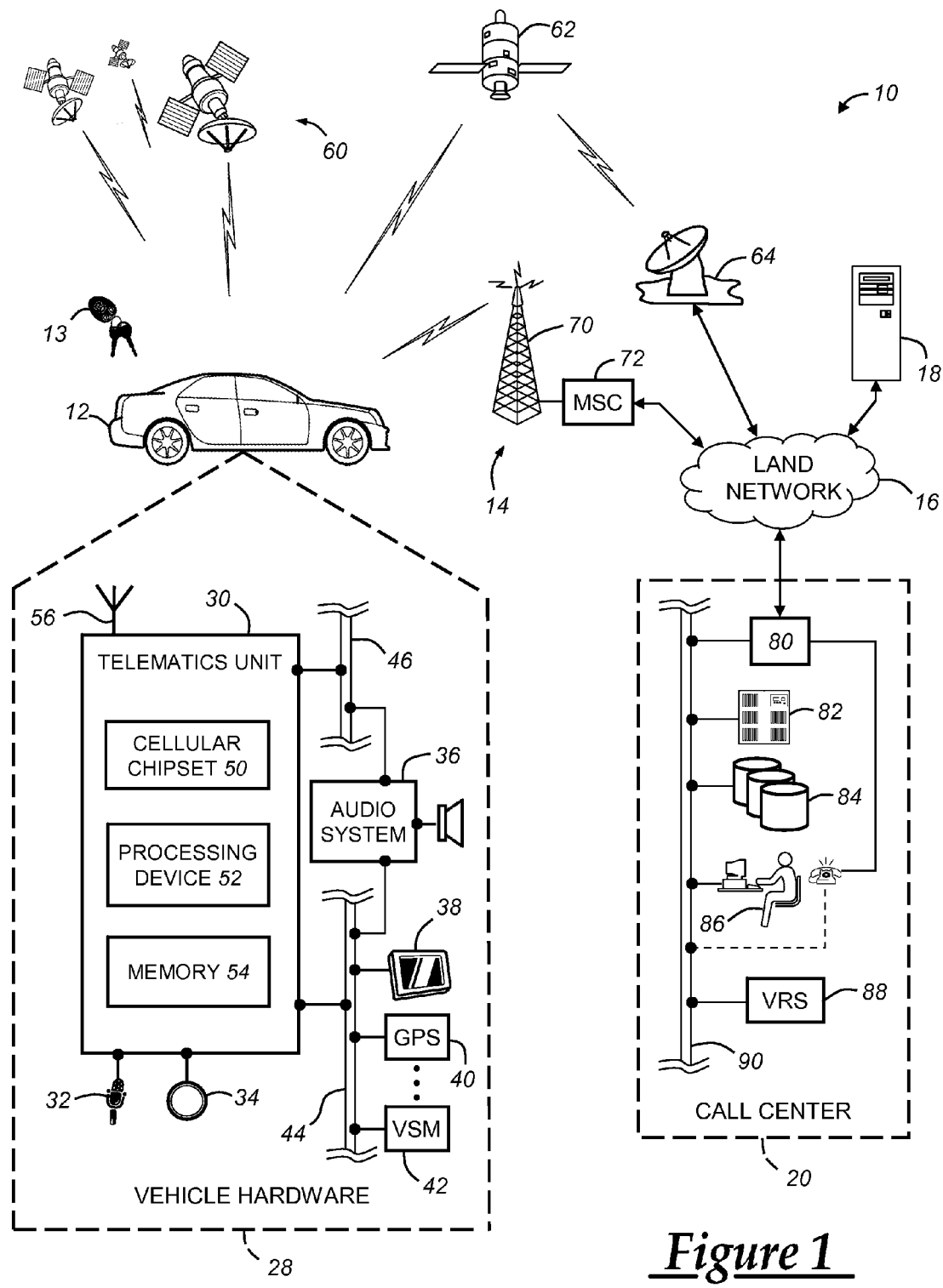
FIG. 1 is a block diagram depicting an exemplary embodiment of a communications system that is capable of utilizing the security method disclosed herein.

With reference to FIG. 1, there is shown an exemplary operating environment that comprises a mobile vehicle communications system 10 and that can be used to implement the security method disclosed herein. Communications system 10 generally includes a vehicle 12, one or more wireless carrier systems 14, a land communications network 16, a computer 18, and a call center 20. It should be understood that the disclosed security method can be used with any number of different systems and is not specifically limited to the operating environment shown here. Also, the architecture, construction, setup, and operation of the system 10 and its individual components are generally known in the art. Thus, the following paragraphs simply provide a brief overview of one such exemplary system 10; however, other systems not shown here could employ the disclosed security method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Included with the vehicle 12 is a keyfob 13 that includes a remote transmitter which communicates with a base unit installed in the vehicle 12 to provide the vehicle operator with localized wireless access to various vehicle functions such as locking and unlocking doors, arming and disarming of a vehicle alarm system, trunk release, and panic signaling. The keyfob includes buttons for these various features so that, for example, by depressing the panic button on the keyfob, the transmitter signals the vehicle to sound a high decibel alarm that can be heard for some distance. As used herein, the term "keyfob" includes not only separate transmitters that can be attached to a key or set of keys by a loop or tether, but also portable remote transmitters regardless of whether they are attached to keys, as well as remote transmitters that are integrated together with a vehicle key as a single component. The keyfob and its associated base unit on the vehicle can be conventional components that are well known to those skilled in the art.

In addition to the keyfob 13, some of the other vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 is an OEM-installed device that enables wireless voice and/or data communication over wireless carrier system 14 and via wireless networking so that the vehicle can communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM or CDMA standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as EVDO, CDMA, GPRS, and EDGE. Wireless networking between the vehicle and other networked devices can also be carried out using telematics unit 30. For this purpose, telematics unit 30 can be configured to communicate wireless according to one or more wireless protocols, such as any of the IEEE 802.11 protocols, WiMAX, or Bluetooth. When used for packet-switch data communication such as TCP/IP, the telematics unit can be configured with a static IP address or can set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Security Method—

Figure 2:
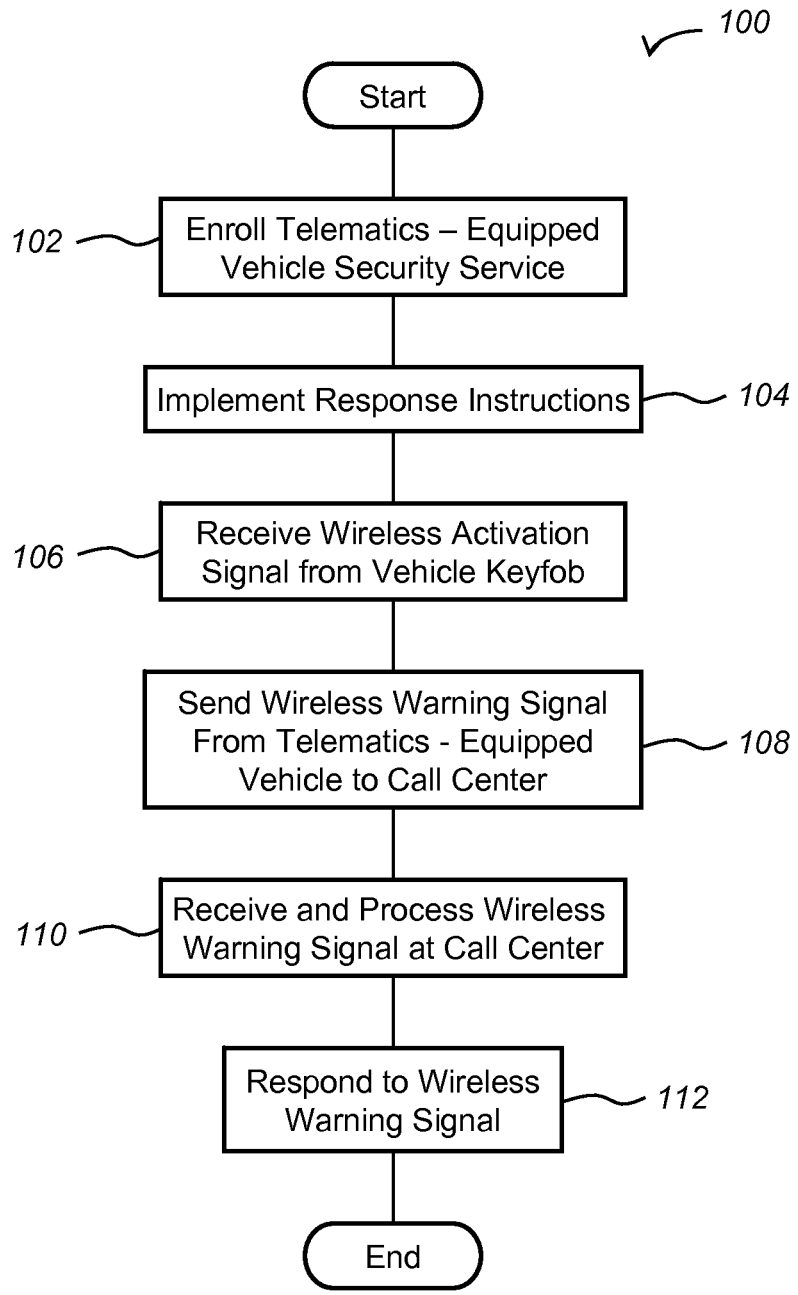
FIG. 2 is a flowchart illustrating some of the steps of an embodiment of the security method.

Turning now to FIG. 2, there is shown a flowchart that illustrates some of the steps of an embodiment 100 of the security method. It should be recognized that this is but an exemplary embodiment of the present invention and that numerous changes could be made to the security method illustrated in FIG. 2, including changes to the specific steps, the particular sequence of the steps, and the components and/or entities involved in the steps.

Beginning with step 102, security method 100 first enrolls a telematics-equipped vehicle 12 in the security service. According to one embodiment, step 102 provides a vehicle owner or other user with the option of enrolling in the security service, as not every user may want security method 100 performed when they engage their keyfob panic button. As part of the enrollment process, step 102 may require different pieces of information from the vehicle user such as a designated location, a contact number, and a confidential code. The designated location generally corresponds to a place where it is expected that the vehicle will oftentimes be located. This piece of information can be useful to certain features of security method 100, as will be subsequently explained. Typically, the designated location corresponds to a home or work address of the vehicle user, although it could be representative of another location as well. The designated location can be provided in step 102 in one of a variety of forms, including: as a street address, GPS coordinates, or as an entire area defined by a zip code, city or county boundary, etc.

The contact number is preferably the primary phone number (landline number, mobile number, etc.) of the vehicle user, and provides security method 100 with a way of reaching the vehicle user in the event that it needs to contact them. Of course, other types of contact numbers such as email addresses, websites, etc. could be used in lieu of or in addition to the above-mentioned phone numbers. Multiple contact numbers could also be provided in step 102 according to a preferred calling sequence so that if security method 100 needs to contact the vehicle user, it can attempt to reach them according to the predetermined sequence. These multiple contact numbers can relate to alternative methods of reaching the same person, or they can correspond to different people; emergency contact persons, spouses, family members, neighbors, etc.

The confidential code is preferably a secret combination of alpha-numeric characters—not unlike a password or PIN number—and is generally designed to provide the vehicle user with a way of authenticating themselves. In an alternative use, the vehicle user can use the confidential code to covertly alert an entity at call center 20 or other location that they are in presently in danger but, because of the circumstances, are unable to elaborate. It should be appreciated that the enrollment process and the various pieces of information can be provided in step 102 according to a variety of different methods. For instance, the vehicle user can convey the information to call center 20 over a phone, via an affiliated website, through email communications, by text messaging, or according to some other technique known by those skilled in the art.

Next, one or more response instructions are implemented at telematics-equipped vehicle 12, at call center 20, at some other location, or at some combination thereof, step 104. The response instructions are usually embodied in software or firmware that is stored in memory, and are generally designed to respond to the activation of a keyfob panic button for an enrolled vehicle. The response instructions can be executed, performed, saved, stored, or otherwise maintained at call center 20, telematics-equipped vehicle 12, some other entity, or at a combination thereof. In the embodiment where the response instructions are exclusively stored at call center 20, activation of the keyfob panic button causes telematics-equipped vehicle 12 to send a wireless warning signal to call center 20 so that the call center can process the signal information and develop an appropriate response. This differs somewhat from the embodiment where the response instructions are stored at telematics-equipped vehicle 12. In that embodiment, activation of the panic button generally causes a device within telematics-equipped vehicle 12 to execute the response instructions before sending a wireless warning signal to call center 20. In some cases, the response instructions stored and executed at the vehicle may determine that a wireless warning signal is appropriate, in other cases they may decide that it is not. One advantage of maintaining the response instructions at telematics-equipped vehicle 12 is that it can lower airtime costs by eliminating some unnecessary wireless transmissions; i.e.—wireless transmissions that would be sent if the response instructions were maintained at the call center. If the response instructions are maintained at telematics-equipped vehicle 12, then call center 20 can wirelessly push the instructions to the vehicle when the vehicle is enrolled in the security services, or the response instructions can be saved to the vehicle during manufacture and can simply be activated when enrolled, to cite two possibilities.

Once telematics-equipped vehicle 12 has been enrolled in the security services and the appropriate response instructions have been established, the vehicle is ready to receive a wireless activation signal from the vehicle keyfob, step 106. When a user presses the panic button on their vehicle keyfob or other wireless transmitter, a wireless activation signal is sent to the vehicle that indicates that the panic button has been engaged. One benefit of utilizing the vehicle keyfob to initiate the security services is that the corresponding hardware is generally already in place. Depending on the contents of the response instructions, telematics-equipped vehicle 12 may decide to take one of a number of different courses of action. For example, the response instructions may be designed so that each time the panic button is engaged, regardless of the location of the vehicle, a wireless warning signal is sent from telematics-equipped vehicle 12 to call center 20. Alternatively, response instructions maintained at telematics-equipped vehicle 12 could first determine whether or not a wireless warning signal to the call center was warranted and, based on that determination, decide whether or not to transmit a signal. This feature will be subsequently described in more detail. One or more lights and/or alarms on the vehicle could be activated in standard fashion in conjunction with executing security method 100. Following the reception of a wireless activation signal from the vehicle keyfob, telematics-equipped vehicle 12 sends a wireless warning signal to call center 20 or some other entity, step 108.

Transmission of the wireless warning signal is generally carried out according to communications methods known in the art including, but not limited to, radio-frequency (RF) transmissions sent through wireless carrier system 14. These transmissions could be sent according to packet-data, circuit switched, SMS, WiFi or other technologies known to those skilled in the art. The wireless warning signal is generated in response to the activation of the vehicle keyfob panic button and can include one or more pieces of information. As an example, the wireless warning signal can include: information indicating that a vehicle keyfob panic button has been activated, a vehicle identifier, a vehicle location, as well as any number of other pertinent pieces of data. The activation indication can be expressed in any suitable form, so long as it informs or notifies the recipient, which is typically call center 20, that a panic button has been engaged. For instance, the activation indication could be expressed as some type of code embedded in the contents of the wireless warning signal, or the signal could be transmitted on a certain frequency where the frequency itself acts as the notification. These are, of course, only two of the many possibilities.

The vehicle identifier preferably uniquely identifies the source or origin of the wireless warning signal so that the recipient knows which vehicle is making the call. Some examples of potential vehicle identifiers include, but are certainly not limited to: electronic serial numbers (ESNs), mobile equipment identifiers (MEIDs), mobile identification numbers (MINs), mobile directory numbers (MDNs), media access control addresses (MAC addresses), Internet protocol addresses (IP addresses), vehicle identification numbers (VINs), proprietary vehicle IDs, and subscriber account numbers and/or names. Again, the actual contents of the vehicle identifier can be expressed in a variety of ways, including abbreviated or shortened forms that reduce the amount of data being sent.

The vehicle location generally provides the last known location of the telematics-equipped vehicle, and can be obtained through one of a variety of methods. For example, if telematics-equipped vehicle 12 is powered up (i.e.—engine running or key in ignition and electric accessories turned on), then the vehicle location can be obtained by interrogating GPS module 40 or some other module for the most recent GPS coordinates of the vehicle. Coordinates that are contemporaneously acquired in response to the interrogation are generally considered "current" coordinates; ones that are acquired from a memory location and represent the last recorded coordinates are generally considered "aged" coordinates. If telematics-equipped vehicle 12 is not powered up (i.e.—the key is not engaged in the ignition), then the vehicle location can be obtained by either interrogating a vehicle electronic module for aged coordinates, or by powering up GPS module 40 and acquiring current coordinates. Of course, more complex techniques for determining the validity of the vehicle location information could also be used. For instance, if aged coordinates have not been updated within a certain amount of time, then they could be considered invalid and a new coordinates would be requested.

In step 110, call center 20 receives and processes the wireless warning signal from telematics-equipped vehicle 12 so that it can formulate an appropriate response. As previously explained, the wireless warning signal should signify to the call center that a vehicle keyfob panic button has been activated, as well as conveying other information such as the identification of the vehicle, the vehicle location, etc. Depending on the contents of the response instructions, call center 20 determines if they should respond to the wireless warning signal and, if so, a call is placed to one or more of the saved contact numbers, step 112. If a call is placed to a contact number and the vehicle user indicates that assistance is needed, or if no one answers the call, then call center 20 can respond by engaging the services of a public-safety answering point (PSAP) and providing it with the vehicle's presumed location, as well as any other helpful information known about the user; i.e.—their name, age, any known health conditions, etc. If the user answers the call and states that the panic button was engaged inadvertently or if the reason for engaging the panic button is a non-emergency situation, then there may not be a need to engage the services of the PSAP.

As previously indicated, security method 100 can include one or more additional features that help minimize the occurrence of false or non-emergency signals. One such feature uses the vehicle location to determine if telematics-equipped vehicle 12 is within a certain proximity of the previously saved designated location. To elaborate, if a user is looking for their vehicle in a crowded parking lot and engages their panic button in order to set off their alarm to find their vehicle, then this feature would compare the vehicle location to the designated location (which is usually a home or work address) and conclude that they are not within a predetermined proximity of one another. In the embodiment where response instructions are stored at telematics-equipped vehicle 12, the response instructions could include the following steps: acquire the vehicle location from GPS module 40, compare the vehicle location to the designated location which is stored at the vehicle, and only send a wireless warning signal to call center 20 if those two locations are within a certain proximity of each other. If the vehicle is not within the predetermined proximity of the designated location, then no wireless warning signal is sent.

The aforementioned scenario is somewhat different from the situation where the response instructions are stored at the call center. In this case, the response instructions could include the following steps: determine the vehicle location from the wireless warning signal sent by telematics-equipped vehicle 12, compare the vehicle location to a designated location stored at call center 20, and instruct the call center to respond only if the vehicle location is within a certain proximity of the designated location. In both cases, a vehicle location is compared to a designated location in order to determine if they are within a certain proximity; the general difference being where that comparison is made, at the telematics-equipped vehicle or at the call center. It is also possible for the user to provide multiple designated locations; a home address, a work address, and the address of a vacation home, for example. In this embodiment, the location checking feature could check to see if the telematics-equipped vehicle was within a certain proximity of any of these three locations. If it was within the proximity of any of the three designated locations, then the security method would respond accordingly. If the vehicle was not proximate to any of the three locations, then it could ignore the wireless warning signal or perform a response other than calling the user. It should be understood that the location checking feature is an optional feature for use with security method 100, and that other features not disclosed herein could also be used.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A method for providing a security service using a vehicle keyfob, comprising the steps of:
   (a) receiving a wireless activation signal from the vehicle keyfob at a telematics-equipped vehicle;
   (b) utilizing the wireless activation signal to determine if a panic button has been engaged; and
   (c) if the panic button has been engaged and the vehicle is within a predetermined distance from a user-specified location stored at the vehicle, then sending a wireless warning signal from the telematics-equipped vehicle to a call center, wherein the wireless warning signal indicates that the panic button on the vehicle keyfob has been engaged.

2. The method of claim 1, further comprising the step of:
   enrolling the telematics-equipped vehicle in the security service by acquiring from a customer at least one piece of information from the group consisting of: the user-specified location, a contact number for responding to the wireless warning signal, and a confidential code.

3. The method of claim 1, further comprising, prior to step (a), the step of: implementing response instructions that compare a vehicle location to the user-specified location to determine if they are within the predetermined distance of each other.

4. The method of claim 1, wherein step (c) further comprises sending vehicle location information to the call center with the wireless warning signal.

5. The method of claim 3, wherein the response instructions are implemented at the telematics-equipped vehicle and include the following steps: i) determining the vehicle location from a GPS module in the telematics-equipped vehicle, ii) comparing the vehicle location to the designated location, which is maintained at the telematics-equipped vehicle, and iii) instructing the telematics-equipped vehicle to send the wireless warning signal in step (c) if the vehicle location is within the certain proximity of the designated location.

6. The method of claim 3, wherein the vehicle location is determined by obtaining previously saved vehicle location data.

7. The method of claim 3, wherein the vehicle location is determined by powering up a GPS module in the telematics-equipped vehicle and obtaining new vehicle location data.

8. The method of claim 1, wherein the panic button can also be used to set off a light and/or alarm on the telematics-equipped vehicle.

9. The method of claim 1, further comprising the step of: responding to the wireless warning signal by placing a call to a previously provided contact number, and engaging the services of a public-safety answering point (PSAP) if needed.

* * * * *